(No Model.)
N. W. GALES.
MILK SCALDER.
No. 464,622. Patented Dec. 8, 1891.
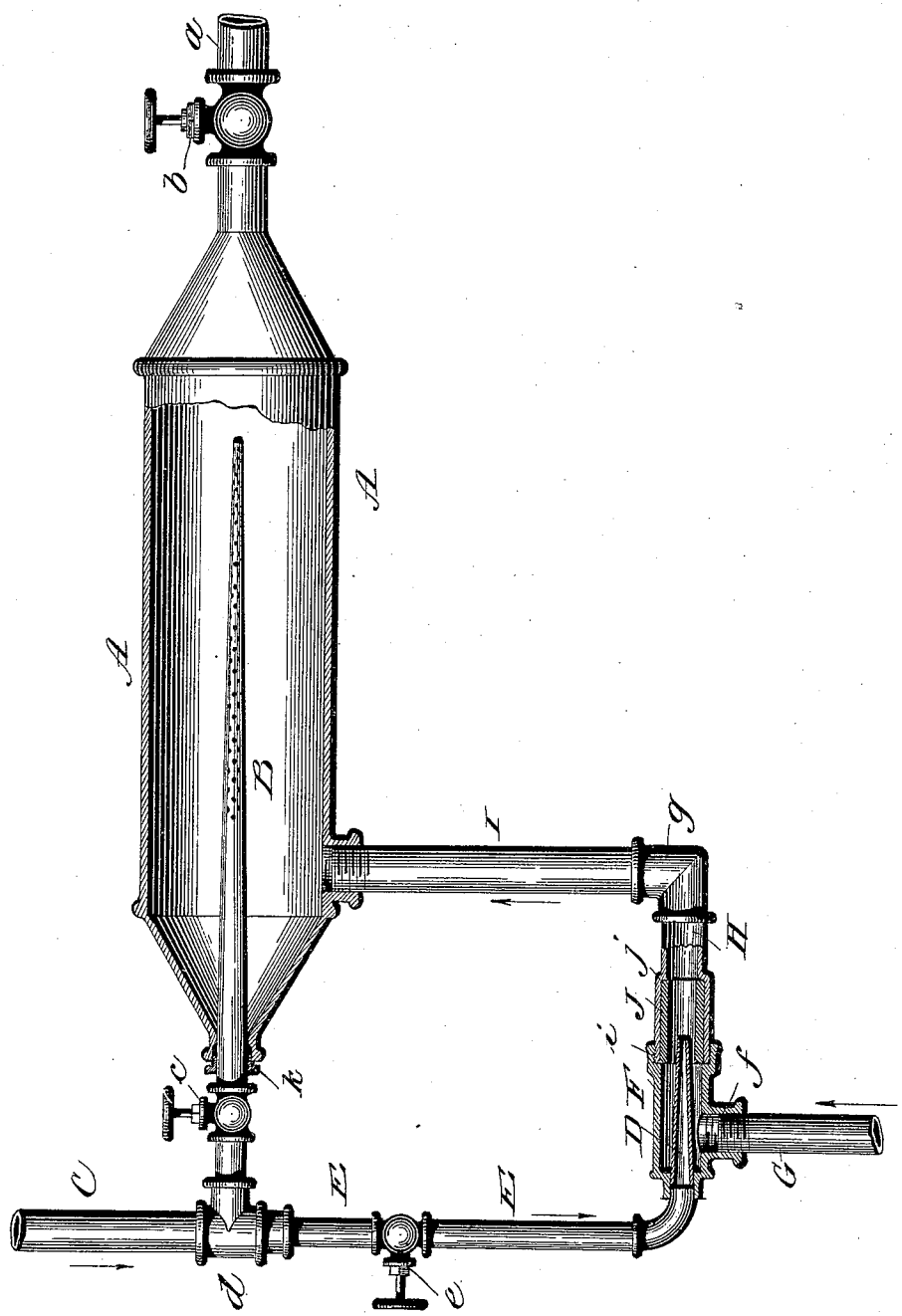
Witnesses
L. C. Hills
E. H. Bond
Inventor
Nicholas W. Gales
per Chas. H. Fowler
Attorney
THE NORRIS PETERS CO., PHOTO-LITHO., WASHINGTON, D. C.

United States Patent Office.

NICHOLAS W. GALES, OF COLO, IOWA.

MILK-SCALDER.

SPECIFICATION forming part of Letters Patent No. 464,622, dated December 8, 1891.

Application filed June 25, 1891. Serial No. 397,406. (No model.)

*To all whom it may concern:*

Be it known that I, NICHOLAS W. GALES, a citizen of the United States, residing at Colo, in the county of Storey and State of Iowa, have invented certain new and useful Improvements in Milk-Scalders; and I do hereby declare that the following is a full, clear, and exact description of the same, reference being had to the annexed drawings, making a part of his specification, and to the letters of reference marked thereon.

This invention relates to certain new and useful improvements in devices for and method of scalding milk, preferably skim-milk, as it leaves the separators, to keep it from souring. Milk treated in accordance with my invention will keep for days.

The other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which is shown a view, partly in side elevation and partly in section, with portions broken away, of my improved apparatus.

Referring now to the details of the drawings by letter, A designates a receptacle, which may be of any desired shape and capacity, preferably of substantially the shape shown, and having at one end a discharge $a$, through which the milk after being scalded is allowed to pass to the desired receptacle or place. A suitable cock or valve $b$ is provided in this discharge-pipe, as shown. Extending into the receptacle from the other end is a perforated pipe B, preferably tapered, as shown, and extending centrally within the receptacle and for a greater part of the length thereof. This pipe B is connected with the pipe C, which is designed to be connected with the boiler or other source of steam (not shown) in any suitable manner, and between its connection with the pipe C and the receptacle the pipe B is provided with a cock or valve $c$, as shown. From the coupling $d$ there extends a pipe E, provided with a cock or valve $e$, as shown, and which pipe at its lower end is turned horizontally and provided with a jet-tube D. This jet-tube is arranged within the coupling F, which is provided with a neck $f$ at right angles to the said tube and with which is connected the pipe G, which is designed to be connected with the separator (not shown) in any suitable manner or with any other receptacle from which it is desired to take the milk to be treated.

To the end of the coupling F opposite to that into which the jet-tube is introduced there is connected the pipe H, which connects with the elbow $g$, to which is connected the pipe I, which is connected with the receptacle A at the end nearest the entrance of the perforated pipe B, as shown. The coupling F is formed with an offset $i$ and the pipe H with an offset $j$, in which is fitted the wooden sleeve or lining J, which is arranged at the point where the jet-tube D delivers steam. This wooden lining prevents burning of the milk at this point and thus avoids filling up of the pipe.

In operation, the pipe C being connected with the source of steam, the pipe G with the milk-receptacle, and the pipe $a$ to any desired place of deposit of the scalded milk, the cock $b$ is opened, the cock $c$ closed, and the cock $e$ opened. The flow of steam through the pipe E and jet-tube D creates a suction which draws the milk up through the pipes G and H into the receptacle A. When there is sufficient milk in the receptacle for it to pass out the discharge $a$, the cock $e$ is closed and the cock $c$ opened, allowing the steam to pass directly into the milk in the receptacle through the pipe B and thus scald the milk. The temperature of the milk can be easily regulated by the manipulation of the cocks or valves. The cock $e$ may be left open all the time, if desired.

The wooden lining at the discharge end of the jet-tube is deemed important, as it prevents burning of the milk at this point, and also prevents stoppage of the apparatus by the filling of the pipes with sediment caused by the burning of the milk.

A suitable packing-box of any well-known construction is connected to the end of the receptacle A, so as to form a tight joint between it and the perforated pipe B, and thus prevent any leakage at this point.

What I claim as new is—

1. The combination, with the receptacle having discharge-pipe, of the steam-pipe, the perforated pipe connected therewith and extended into the receptacle, the milk-inlet pipe, the jet-tube extended across the end thereof, and the pipe leading to the receptacle and into which the end of the jet-tube extends, as set forth.

2. The combination, with the receptacle, its discharge and inlet pipes and perforated steam-pipe, of the jet-tube and the wooden lining at the discharge end of the jet-tube, as and for the purpose specified.

In testimony that I claim the above I have hereunto subscribed my name in the presence of two witnesses.

NICHOLAS W. GALES.

Witnesses:
JOHN NILAND,
JAS. MCCOY.